(12) United States Patent
Nagata et al.

(10) Patent No.: US 8,089,605 B2
(45) Date of Patent: Jan. 3, 2012

(54) LIQUID CRYSTAL DISPLAY DEVICE

(75) Inventors: Tetsuya Nagata, Mobara (JP); Hitoshi Azuma, Yokohama (JP); Susumu Sasaki, Chiba (JP); Takao Ebine, Ootaki (JP); Katsuyuu Takahashi, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 318 days.

(21) Appl. No.: 12/582,753

(22) Filed: Oct. 21, 2009

(65) Prior Publication Data

US 2010/0097561 A1 Apr. 22, 2010

(30) Foreign Application Priority Data

Oct. 22, 2008 (JP) .................. 2008-271852

(51) Int. Cl.
*G02F 1/1333* (2006.01)
(52) U.S. Cl. ...................................................... 349/158
(58) Field of Classification Search .................. 349/158, 349/43, 60
See application file for complete search history.

(56) References Cited

U.S. PATENT DOCUMENTS

| 4,198,647 A * | 4/1980 | Grinberg et al. ................ 349/28 |
| 5,307,190 A * | 4/1994 | Wakita et al. ................. 349/158 |
| 6,462,803 B2 * | 10/2002 | Kumagai et al. .............. 349/153 |

FOREIGN PATENT DOCUMENTS

JP 2003-280548 10/2003

\* cited by examiner

*Primary Examiner* — James Dudek
(74) *Attorney, Agent, or Firm* — Antonelli, Terry, Stout & Kraus, LLP.

(57) ABSTRACT

A liquid crystal display panel includes an inorganic thin film which constitutes at least transistors, electrodes and lines. A first substrate includes a first inner surface which faces a second substrate in an opposed manner and a first outer surface on a side thereof opposite to the second substrate. The second substrate includes a second inner surface which faces the first substrate in an opposed manner and a second outer surface on a side thereof opposite to the first substrate. The inorganic thin film is formed on the first or second inner surface in a close contact manner. The center of a thickness ranging from the first outer surface to the second outer surface is positioned inside the second substrate. The relationship of $T_1+D<T_2$ is established among a thickness $T_1$ of the first substrate, a thickness $T_2$ of the second substrate, and a distance D between the first and second inner surfaces.

8 Claims, 4 Drawing Sheets

LIQUID CRYSTAL DISPLAY DEVICE

The present application claims priority from Japanese applications JP 2008-271852 filed on Oct. 22, 2008, the content of which is hereby incorporated by reference into this application.

BACKGROUND OF THE INVENTION

1. Field of the Invention

The present invention relates to a liquid crystal display device having a bendable display screen.

2. Description of the Related Art

A liquid crystal display panel is bendable by making a substrate thin (see, JP-A-2003-280548). With respect to first and second substrates which face each other in an opposed manner, edge portions of opposing surfaces of these substrate are firmly fixed to each other. Accordingly, when the first and second substrates are bent such that an outer surface of the first substrate forms a convex surface and an outer surface of the second substrate forms a concave surface, a tensile stress is generated in the first substrate and a compressive stress is generated in the second substrate. Accordingly, in forming a circuit which includes TFTs (thin film transistors) and lines on the first substrate in a tensile state, it is necessary to form the circuit such that any cracks and line disconnections do not occur.

SUMMARY OF THE INVENTION

It is an object of the present invention to provide a liquid crystal display panel and a liquid crystal display device which can prevent the occurrence of cracks and disconnection in a circuit even when the liquid crystal panel and the liquid crystal display device are bent.

(1) According to a first aspect of the present invention, there is provided a liquid crystal display device which includes: a first substrate and a second substrate which are arranged to face each other in an opposed manner with a gap defined therebetween; a seal which fixes an edge portion of the first substrate and an edge portion of the second substrate to each other; liquid crystal which is filled into the gap defined between the first and second substrates; and an inorganic thin film which constitutes at least transistors, electrodes and lines, wherein the first substrate includes a first inner surface which faces the second substrate in an opposed manner and a first outer surface on a side thereof opposite to the second substrate, the second substrate includes a second inner surface which faces the first substrate in an opposed manner and a second outer surface on a side thereof opposite to the first substrate, the inorganic thin film is formed on the first or second inner surface in a close contact manner, the center of a thickness ranging from the first outer surface to the second outer surface is positioned inside the second substrate, and the relationship of $T_1+D<T_2$ is established among a thickness $T_1$ of the first substrate, a thickness $T_2$ of the second substrate, and a distance D between the first and second inner surfaces.

In the present invention, the center of a thickness ranging from the first outer surface to the second outer surface is positioned inside the second substrate. Accordingly, when the liquid crystal display device is bent such that the second outer surface forms a convex surface, a tensile stress is generated only in a portion ranging from the second outer surface to the center of the thickness. That is, a tensile stress is generated neither on the first inner surface nor on the second inner surface. Accordingly, the inorganic thin film can be formed on the first inner surface, and the second outer surface which forms a convex surface can be used as a display screen. Alternatively, the inorganic thin film can be formed on the second inner surface, and the first outer surface which forms a concave surface can be used as a display screen. In either case, even if a compressive stress is generated in the inorganic thin film, a tensile stress is not generated in the inorganic film and hence, it is possible to prevent the occurrence of any cracks or circuit disconnection.

(2) In the liquid crystal display device having the constitution (1), the first and second substrates may be bendable such that the first outer surface forms a concave surface, the first inner surface forms a convex surface, the second outer surface forms a convex surface, and the second inner surface forms a concave surface.

(3) In the liquid crystal display device having the constitution (2), the inorganic thin film may be formed on the second inner surface of the second substrate.

(4) In the liquid crystal display device having the constitution (2), the inorganic thin film may be formed on the first inner surface of the first substrate.

(5) In the liquid crystal display device having any one of the constitutions (1) to (4), the first and second substrates may be made of the same material.

(6) In the liquid crystal display device having any one of the constitutions (1) to (4), both the first and second substrates may be made of glass.

(7) In the liquid crystal display device having any one of the constitutions (1) to (4), both the first and second substrates may be made of a resin.

(8) In the liquid crystal display device having any one of the constitutions (1) to (4), both the first and second substrates may be made of materials having the same Young's modulus.

DESCRIPTION OF THE PREFERRED EMBODIMENTS

An embodiment of the present invention is explained in conjunction with drawings.

First Embodiment

Figure 1:
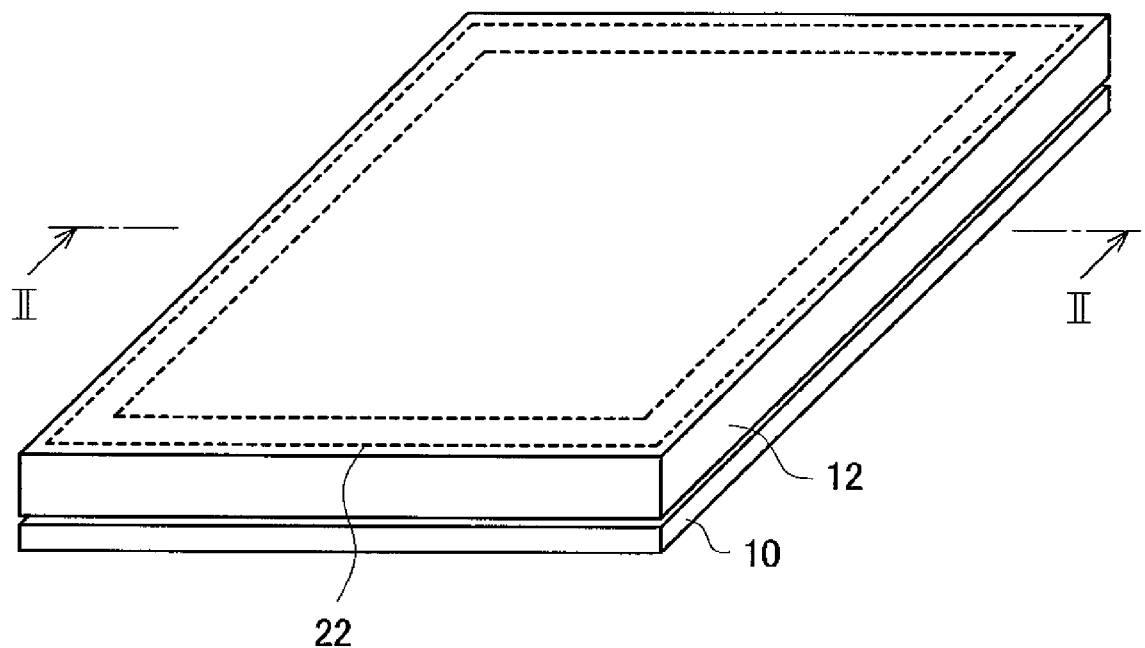
FIG. 1 is a perspective view showing a liquid crystal display panel according to a first embodiment of the present invention.
Figure 2:
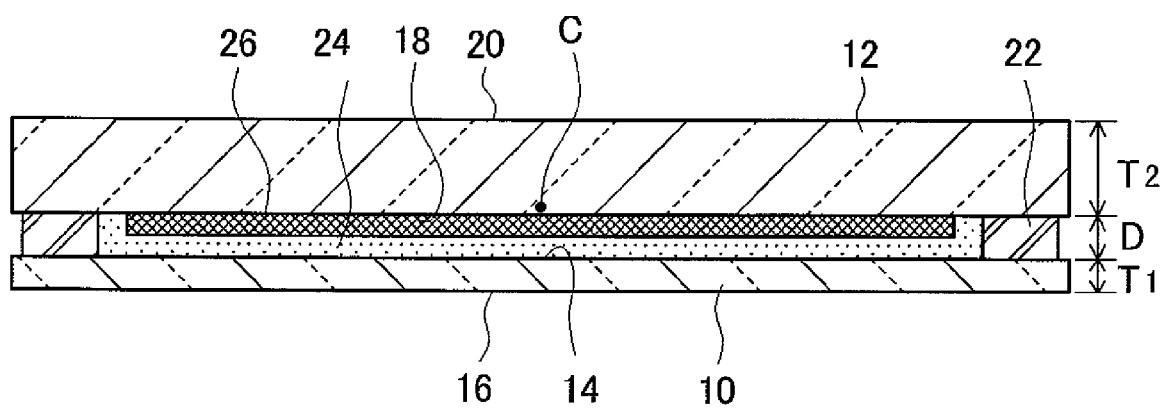
FIG. 2 is a cross-sectional view of the liquid crystal display panel taken along a line II-II in FIG. 1.

FIG. 1 is a perspective view showing a liquid crystal display device according to a first embodiment of the present invention. FIG. 2 is a cross-sectional view of the liquid crystal display device taken along a line II-II in FIG. 1.

The liquid crystal display panel includes a first substrate 10 and a second substrate 12. The first and second substrates 10, 12 are made of the same material (for example, glass or a resin). Both the material for forming the first substrate 10 and the material for forming the second substrate 12 have the same Young's modulus. The first and second substrates 10, 12 have optical transmissivity and are arranged to face each other in an opposed manner with a gap defined therebetween. Further, both the first and second substrates 10, 12 are thin enough to be bendable (including "curvable").

The first substrate 10 includes a first inner surface 14 which faces the second substrate 12 in an opposed manner and a first outer surface 16 on a side thereof opposite to the second substrate 12. The second substrate 12 includes a second inner surface 18 which faces the first substrate 10 in an opposed manner and a second outer surface 20 on a side thereof opposite to the first substrate 10. Polarizers not shown in the drawing are formed on the first and second outer surfaces 16, 20.

The first and second substrates 10, 12 have respective edge portions thereof fixed to each other using a seal 22 made of an epoxy resin, for example. To prevent relative positions of the respective edge portions which are fixed to each other from being displaced from each other, both edge portions are firmly fixed to each other. Liquid crystal 24 is filled into a gap defined between the first and second substrates 10, 12. By making the first and second substrates 10, 12 thin by polishing after filling the liquid crystal 24 in the gap defined between the first and second substrates 10, 12, it is possible to reduce breaking of the first or second substrates 10, 12.

Any drive method may be adopted as a method for driving a liquid crystal display panel including an IPS (In Plane Switching) method, a TN (Twisted Nematic) method and a VA (Vertical Alignment) method, and electrodes and lines which are suitable for the adopted drive method are formed on the substrate.

The center C of a thickness of the liquid crystal display panel ranging from the first outer surface 16 to the second outer surface 20 is positioned inside the second substrate 12. Among a thickness $T_1$ of the first substrate 10, a thickness $T_2$ of the second substrate 10a and a distance D between the first inner surface 14 and the second inner surface 18, the relationship of $T_1+D<T_2$ is established.

An inorganic thin film 26 which constitutes at least transistors, electrodes and lines is formed such that the inorganic thin film 26 is brought into close contact with the second inner surface 18. The second substrate 12 is a TFT (Thin Film Transistor) substrate, and the first substrate 10 is a color filter substrate which includes color layers not shown in the drawing. Here, the inorganic thin film 26 which constitutes at least the electrodes and lines may be formed such that the inorganic thin film 26 goes over an edge portion of the seal 22 and extends to an edge portion of the second substrate 12. In this case, terminals to which signals are inputted from the outside are formed on the inorganic thin film 26 at the edge portion of the second substrate 12. Further, to expose the terminal portion, the second substrate 12 may be formed larger than the first substrate 10 in size as viewed in a plan view.

Figure 3:
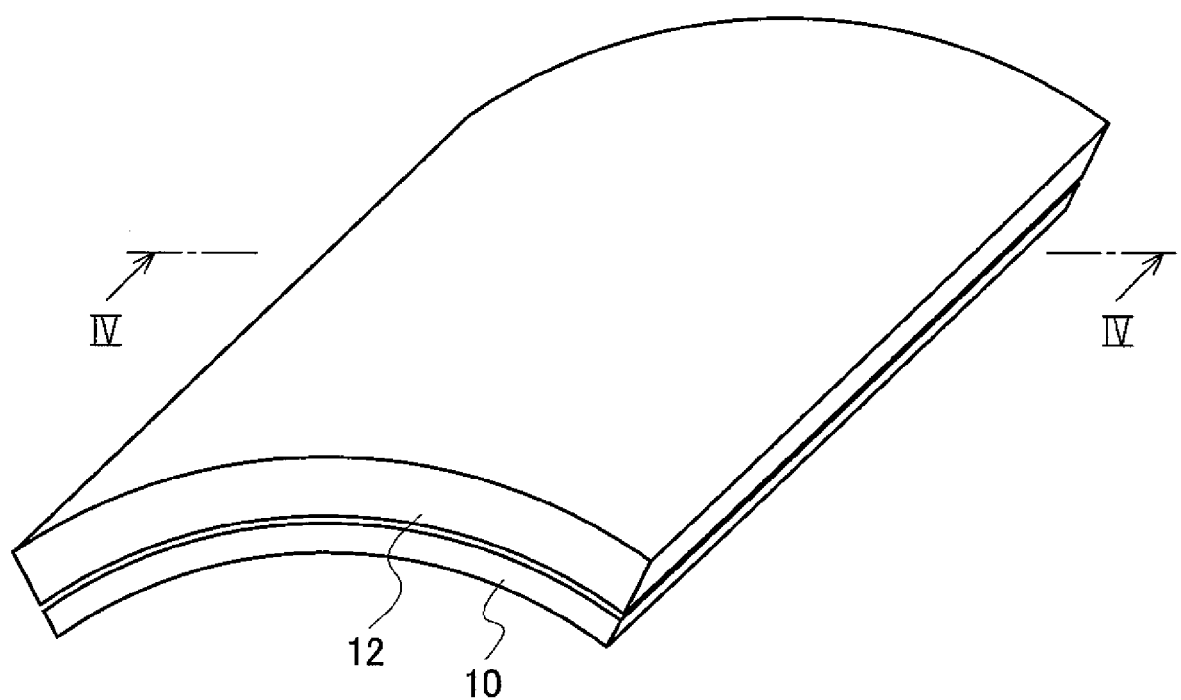
FIG. 3 is a perspective view showing the liquid crystal display panel according to the first embodiment of the present invention in a bent state.
Figure 4:
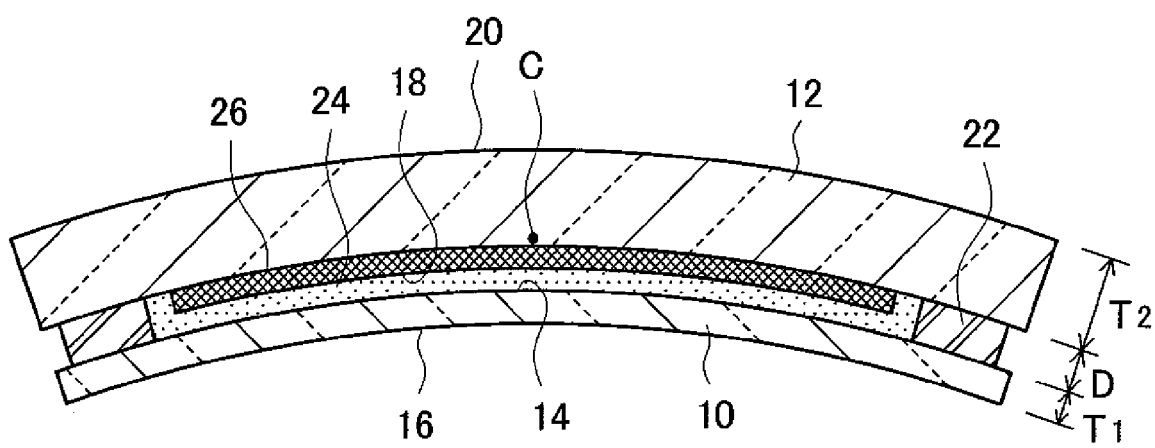
FIG. 4 is a cross-sectional view of the liquid crystal display panel taken along a line IV-IV in FIG. 3.

FIG. 3 is a perspective view showing the liquid crystal display panel according to the first embodiment of the present invention in a bent state. FIG. 4 is a cross-sectional view of the liquid crystal display panel taken along a line IV-IV in FIG. 3.

In the liquid display panel shown in FIG. 3 and FIG. 4, the first and second substrates 10, 12 are bent such that the first outer surface 16 forms a concave surface, the first inner surface 14 forms a convex surface, the second outer surface 20 forms a convex surface, and the second inner surface 18 forms a concave surface.

According to this embodiment, the center C of the thickness of the liquid crystal display panel ranging from the first outer surface 16 to the second outer surface 20 is positioned inside the second substrate 12. Accordingly, when the liquid crystal display panel is bent such that the second outer surface 20 forms a convex surface, a tensile stress is generated in a portion ranging from the second outer surface 20 to the center C of the thickness of the liquid crystal display panel. That is, no tensile stress is generated on the second inner surface 18. Accordingly, the inorganic thin film 26 can be formed on the second inner surface 18 and the first outer surface 16 which forms a concave surface can be used as a display screen. In this case, even if a compressive stress is generated in the inorganic thin film 26, a tensile stress is not generated in the inorganic thin film 26 and hence, it is possible to prevent the occurrence of cracks or disconnection in the circuit.

Second Embodiment

Figure 5:
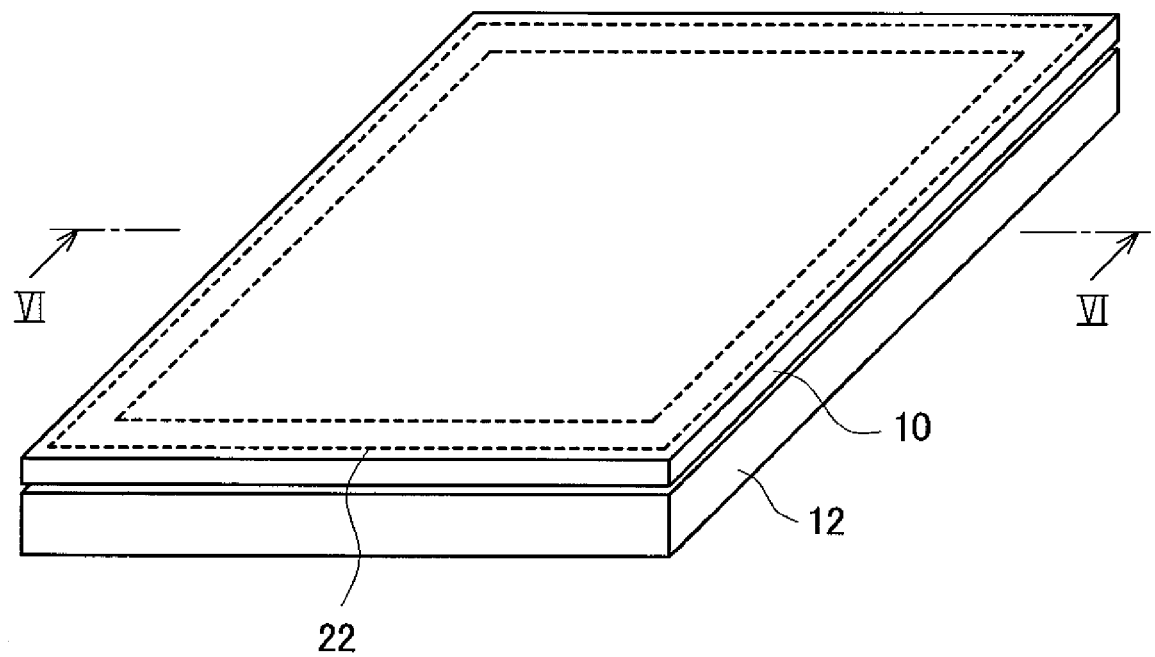
FIG. 5 is a perspective view showing a liquid crystal display panel according to a second embodiment of the present invention.
Figure 6:
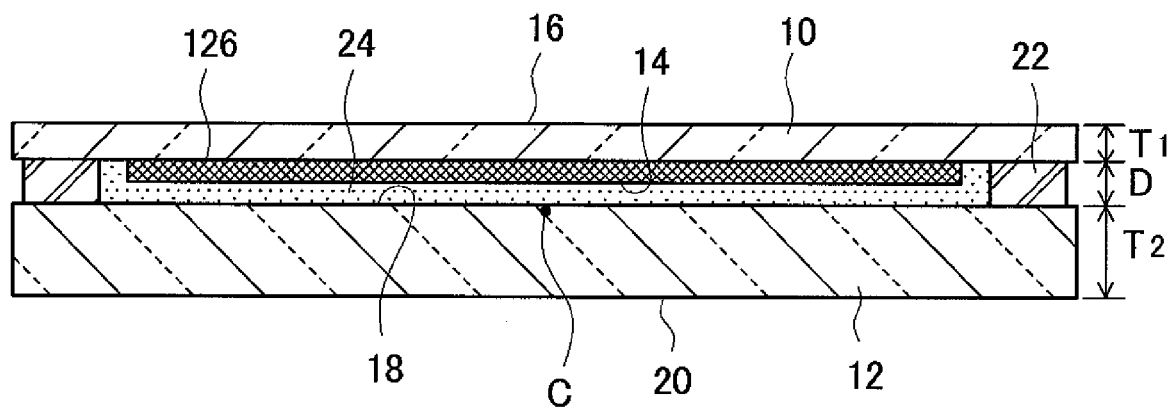
FIG. 6 is a cross-sectional view of the liquid crystal display panel taken along a line VI-VI in FIG. 5.

FIG. 5 is a perspective view showing a liquid crystal display panel according to a second embodiment of the present invention. FIG. 6 is a cross-sectional view of the liquid crystal display panel taken along a line VI-VI in FIG. 5.

In this embodiment, an inorganic thin film 126 which constitutes at least transistors, electrodes and lines is formed such that the inorganic thin film 126 is brought into close contact with a first inner surface 14. A first substrate 10 is a TFT (Thin Film Transistor) substrate, and a second substrate 12 is a color filter substrate which includes colored layers not shown in the drawing. The other constitutions of this embodiment are equal to the corresponding constitutions explained in conjunction with the first embodiment.

Figure 7:
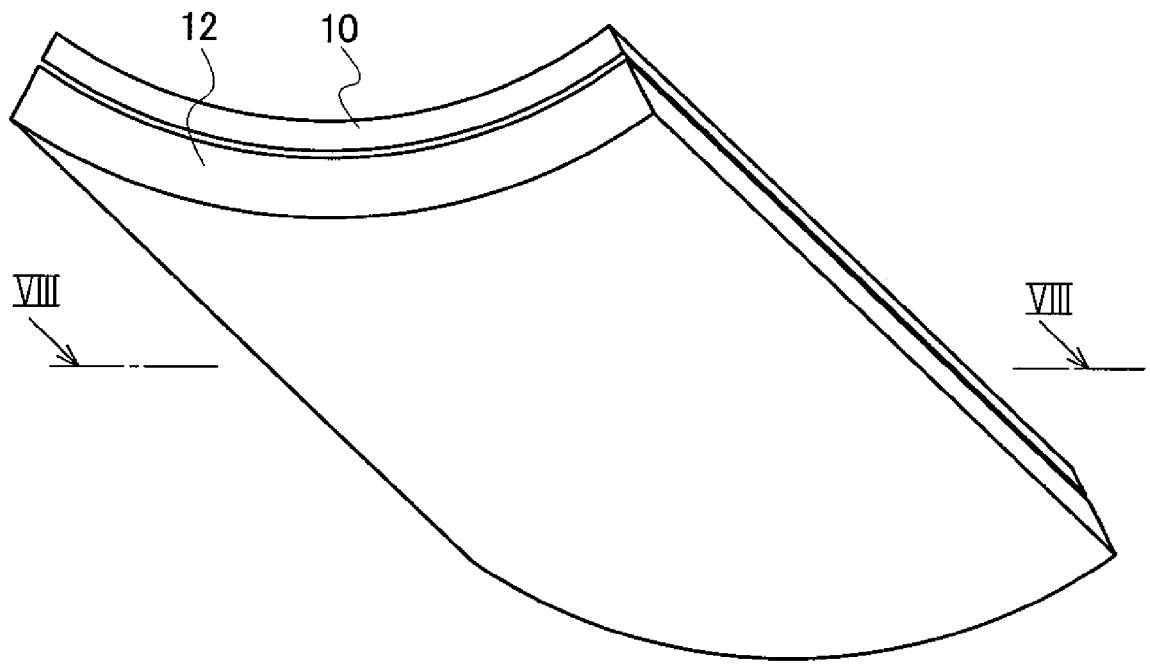
FIG. 7 is a perspective view showing the liquid crystal display panel according to the second embodiment of the present invention in a bent state.
Figure 8:
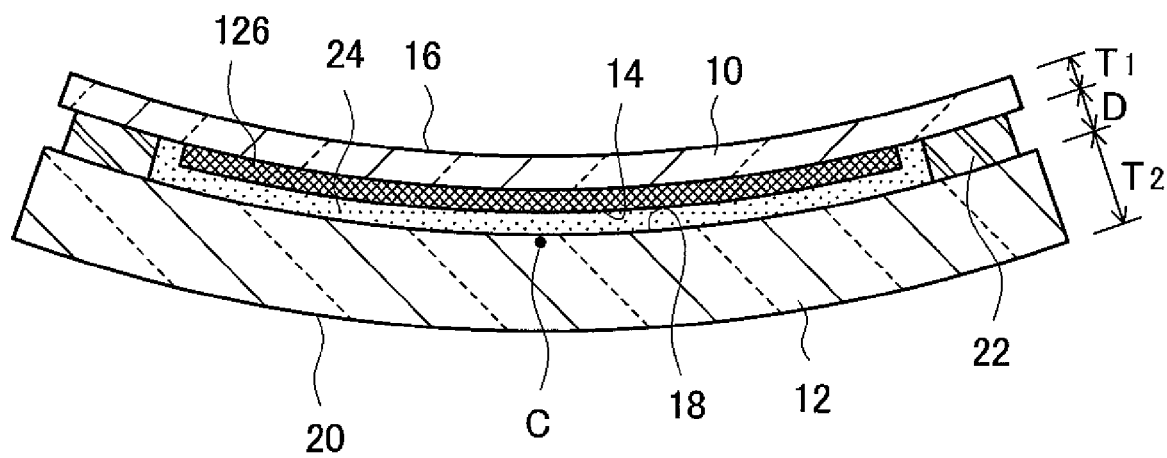
FIG. 8 is a cross-sectional view of the liquid crystal display panel taken along a line VIII-VIII in FIG. 7.

FIG. 7 is a perspective view showing the liquid crystal display panel of the second embodiment of the present invention in a bent state. FIG. 8 is a cross-sectional view of the liquid crystal display panel taken along a line VIII-VIII in FIG. 7.

In the liquid crystal display panel shown in FIG. 7 and FIG. 8, the first and second substrates 10, 12 are bent such that a first outer surface 16 forms a concave surface, a first inner surface 14 forms a convex surface, a second outer surface 20 forms a convex surface, and a second inner surface 18 forms a concave surface.

According to this embodiment, the center C of the thickness of the liquid crystal display panel ranging from the first outer surface 16 to the second outer surface 20 is positioned inside the second substrate 12. Accordingly, when the liquid crystal display panel is bent such that the second outer surface 20 forms a convex surface, a tensile stress is generated in a portion ranging from the second outer surface 20 to the center C of the thickness of the liquid crystal display panel. That is, no tensile stress is generated in the first inner surface 14. Accordingly, the inorganic thin film 126 can be formed on the first inner surface 14, and the second outer surface 20 which forms a convex surface can be used as a display screen. In this case, even if a compressive stress is generated in the inorganic thin film 126, the tensile stress is not generated in the inorganic thin film 126 and hence, it is possible to prevent the occurrence of cracks or disconnection in the circuit.

A liquid crystal display device can be manufactured using the above-mentioned liquid crystal display panel according to the first or second embodiment.

The present invention is not limited to the above-mentioned embodiments and various modifications are conceivable. For example, the constitution explained in the above-mentioned embodiment may be exchangeable with the substantially identical constitution, the constitution which can acquire the same manner of operation and advantageous effects or the constitution which can achieve the same object.

What is claimed is:

1. A liquid crystal display device comprising:
   a first substrate and a second substrate which are arranged to face each other in an opposed manner;
   a seal which fixes an edge portion of the first substrate and an edge portion of the second substrate to each other;
   liquid crystal which is filled into a gap defined between the first and second substrates; and
   an inorganic thin film which constitutes at least transistors, electrodes and lines, wherein
   the first substrate includes a first inner surface which faces the second substrate in an opposed manner and a first outer surface on a side thereof opposite to the second substrate,
   the second substrate includes a second inner surface which faces the first substrate in an opposed manner and a second outer surface on a side thereof opposite to the first substrate,
   the inorganic thin film is formed on the first or second inner surface in a close contact manner,
   a center of a thickness ranging from the first outer surface to the second outer surface is positioned inside the second substrate, and
   a relationship of $T_1+D<T_2$ is established among a thickness $T_1$ of the first substrate, a thickness $T_2$ of the second substrate, and a distance D between the first and second inner surfaces.

2. A liquid crystal display device according to claim 1, wherein the first and second substrates are bendable such that the first outer surface forms a concave surface, the first inner surface forms a convex surface, the second outer surface forms a convex surface, and the second inner surface forms a concave surface.

3. A liquid crystal display device according to claim 2, wherein the inorganic thin film is formed on the second inner surface of the second substrate.

4. A liquid crystal display device according to claim 2, wherein the inorganic thin film is formed on the first inner surface of the first substrate.

5. A liquid crystal display device according to claim 1, wherein the first and second substrates are made of the same material.

6. A liquid crystal display device according to claim 1, wherein both the first and second substrates are made of glass.

7. A liquid crystal display device according to claim 1, wherein both the first and second substrates are made of a resin.

8. A liquid crystal display device according to claim 1, wherein both the first and second substrates are made of materials having the same Young's modulus.

* * * * *